March 3, 1964 J. T. FISHER 3,123,744
METER BOX WITH A MOISTURE BARRIER ASSEMBLY
Filed April 4, 1962
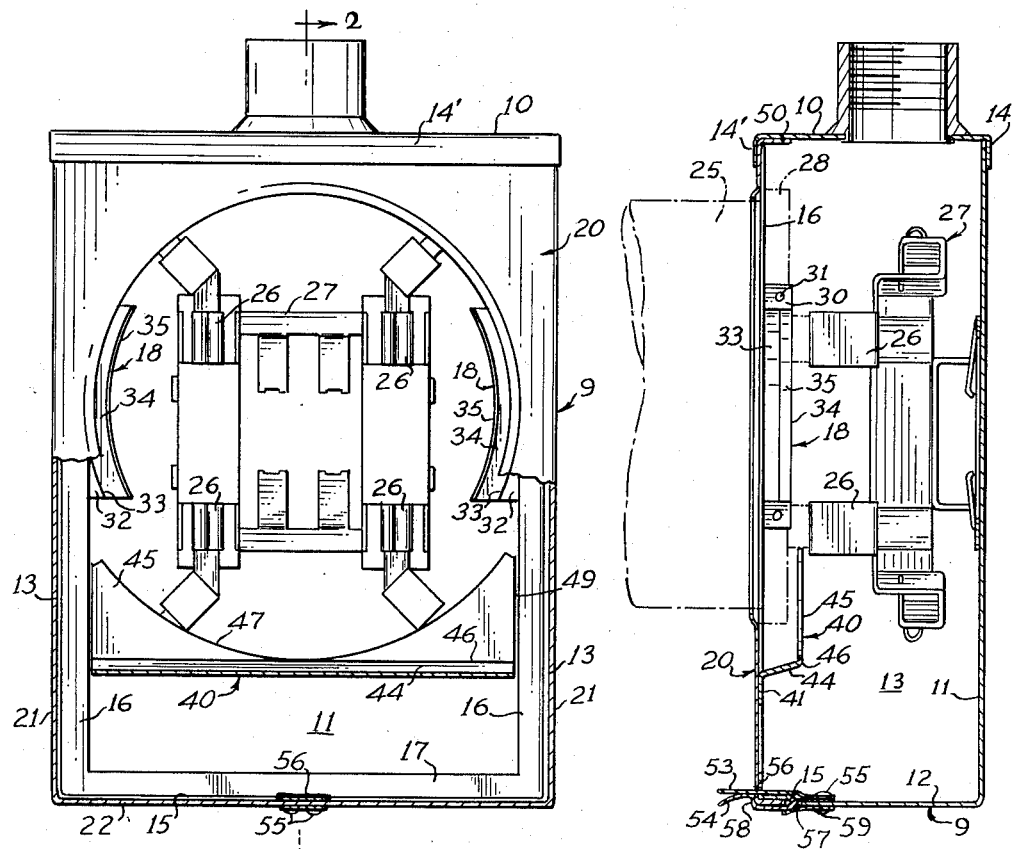
Fig. 1   Fig. 2
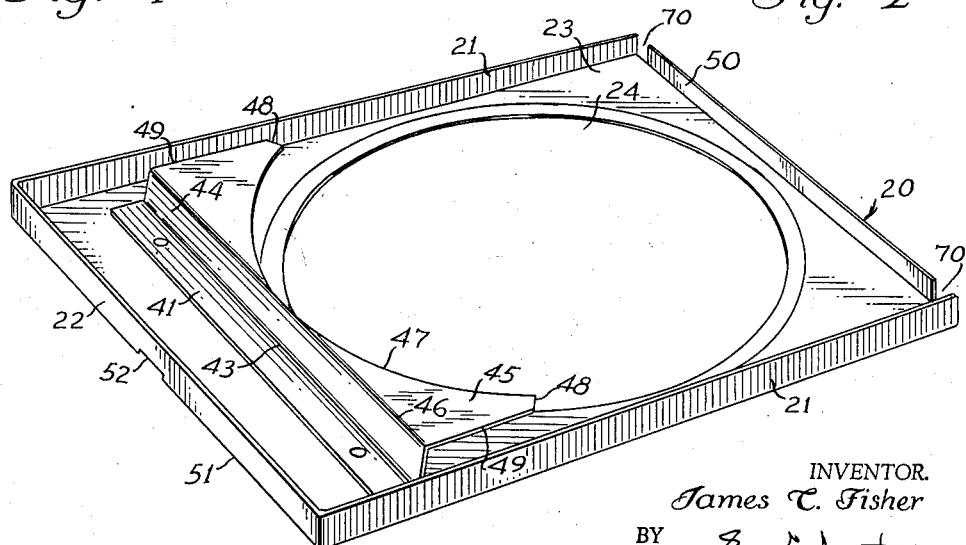
Fig. 3
INVENTOR.
James T. Fisher
BY 
ATTORNEY United States Patent Office 3,123,744
Patented Mar. 3, 1964

3,123,744
METER BOX WITH A MOISTURE BARRIER ASSEMBLY
James T. Fisher, Decatur, Ga., assignor to B & C Metal Stamping Company, Atlanta, Ga., a corporation of Georgia
Filed Apr. 4, 1962, Ser. No. 185,094
9 Claims. (Cl. 317—104)

This invention relates to a meter box, and is more particularly concerned with a meter box with a moisture barrier assembly which protects the exposed electrical elements within the meter box from the weather.

This application is a continuation-in-part of my copending application Serial No. 90,286, filed February 20, 1961.

Meter boxes of the class here disclosed are usually mounted on the exterior of a building so that a meter carried by the boxes may be readily read from time to time. In such an exposed condition, it is important that the electrical elements be shielded from rain, snow and other forms of moisture in the atmosphere and yet be readily accessible when the demand arises. Since such a meter box is normally left unattended for periods of twenty to thirty years in normal use, the accumulation of moisture around the electrical elements and the insulated material surrounding the wires is highly detrimental, causing in some instances short circuits and tending to accelerate the normal aging and disintegration of the insulation surrounding the cables. Further, with the water present in the interior of the box, especially in close proximity to an electrical field, the meter box tends to rust. Therefore, it is seen that it is highly desirable to provide, in a meter box, a means by which the collection of moisture within the meter box is retarded.

Accordingly, it is an object of the present invention to provide a meter box with a shield assembly which will retard the entry of water into the box and direct a substantial part of the moisture which may collect in the meter box away from the electrical elements therein.

Another object of the present invention is to provide a meter box which is inexpensive to manufacture, durable in structure and efficient in operation.

Another object of the present invention is to provide a meter box which is so constructed and arranged that the moisture entering the box between the meter and the meter box and between the cover and the meter box will be directed along a predetermined path so as to eventually be directed exteriorally of the box.

Other objects, features and advantages of the present invention will become apparent from the present description when taken in conjunction with the accompanying drawing wherein like characters of reference designate corresponding parts throughout the several views, and wherein:

FIG. 1 is a partially broken front elevational view of a meter box constructed in accordance with the present invention.

FIG. 2 is a vertical sectional view taken along line 2—2 in FIG. 1, and showing in broken lines the location of the meter.

FIG. 3 is a perspective view of the cover for the meter box shown in FIGS. 1 and 2.

Referring now in detail to the embodiment chosen for the purpose of illustrating the present invention, it being understood that in its broader aspects the present invention is not limited to exact details herein depicted, it will be seen that the meter box includes an open faced housing 9 and a cover 20 therefor. The housing 9 is essentially the same as the box or housing disclosed in my copending application Serial No. 632,576. In more detail, the housing 9 includes a top 10, back 11, bottom 12 parallel to top 10 and sides 13 parallel to each other, all formed of relatively heavy gauge metal. The rear edges of bottom 12 and sides 13 are integrally joined to the bottom edge and side edges respectively of back 11, while the bottom edges of sides 13 and the side edges of bottom 11 are joined. The front edges of sides 13 and bottom 12 terminate in a common plane parallel to back 11.

The top 10 includes a perimetrical flange 14, depending from the edges of top 10 and overlapping the upper edge portions of back 11 and sides 13. The front flange 14' overhangs and is slightly forwardly of the forward edges of the sides 13 so as to receive therebetween the upper edge portions of cover 20.

The front or forward edge portions of the bottom 12 and sides 13 are depressed or offset inwardly, as indicated at numeral 15, so as to receive in outwardly overlapping relationship the side flanges 21 and bottom flange 22 of cover 20. The flanges 21 and 22 depend from the flat rectangular face plate 23 of cover 20, the face plate 23 being provided with a circular opening 24 in its upper midportion which is adapted to fit over a cylindrical meter 25 when the spades of meter 25 are received in the usual fashion in the terminals 26 of the terminal block 27. The terminal block 27, in turn, is carried by the central portion of the back 11, as best seen in FIG. 2.

The outer edges of sides 13 and bottom 14 are turned inwardly to provide side flanges 16 and bottom flange 17 so as to receive in flat abutting relationship the inner surface of face plate 23, when the cover 20 is positioned on the housing 9. The flanges 16 extend throughout the length of sides 13 and their bottom edges are joined to the outer edges of bottom flange 17. The top edges of flanges 16 abut the top 10.

Protruding inwardly on opposite sides of the housing 9 are a pair of opposed mounting channels 18 which are adapted to receive the inner edges of the circular or annular sealing ring 28 of the meter 25. Each mounting channel 18 includes a flat base 30 which fits against the inner surface of the depressed outer portion of a side 13 and is secured thereto by means, such as rivets 31. One edge of the base 30 is bent inwardly to provide a flange 32 which is contiguous with the inner surface of its associated flange 16, but protrudes therebeyond. The protruding edge of the flange 32 is depressed rearwardly to provide an arcuate shoulder 33, the rearmost edge of which supports an arcuate receiving plate 34 which is offset but essentially parallel to the flange 32. The plate 34 protrudes toward the center of the box and is provided with an outwardly turned terminal flange 35 along its innermost edge.

As best seen in FIG. 1, when cover 20 is properly installed on housing 9, the channel portions of the channel members 18, i.e. the U-shaped channels defined by flanges 33, 35 and the plate 34, are inwardly concentric with the opening 24 so that the inner edge of ring 28 is received within each channel portion, with the inner edge of ring 28 resting against the plates, such as plate 34.

According to the present invention, a gutter, denoted generally by numeral 40, is secured on the inner surface of the face plate 23 of cover 20. This gutter 40 is formed from a sheet of metal which is stamped to provide a rectangular base plate 41 of substantially the same width as the distance between the flanges 16. The flat base plate 41 is disposed transversely along the inner surface of face plate 23 and secured thereto by means of a pair of rivets, as seen in FIG. 3, whereby the upper, essentially straight edge 43 of the base plate 41 is essentially horizontal and below opening 24. The base plate 41 is bent inwardly at edge 43 whereby the edge 43 forms a common junction for a rectangular deflection plate 44 which protrudes inwardly and upwardly, as seen in FIG. 2.

An upstanding moisture shield 45 is provided on the inner edge of deflector plate 44 by bending the plate 44 upwardly along its inner edge 46. The shield 45 is essentially vertically disposed in spaced parallel relationship to the face plate 23 and it protrudes upwardly from the deflector plate 46 to terminate slightly below the lower plane of the mounting channels 18. The width of deflector plate 44 is substantially greater than the width of flange 43 and, therefore, the upstanding moisture deflector plate 45 is disposed inwardly of the mounting channels 18.

The moisture shield 45 is provided with an arcuate, upwardly concaved, upper edge 47 which is essentially concentric with and of larger diameter than the opening 24. At the central portion of the gutter 40 the edge 47 is essentially tangential to the edge 46 while the outer extremities of the arcuate edge 47 intersect the radially outwardly and downwardly protruding edge portions 48. The gutter 40 has straight, parallel side edges 49.

A second water shield 50 is provided along the upper edge of the face plate 23. This water shield 50 is an inwardly turned, rectangular flange spaced from the upper ends of the flanges 21 by the width of flanges 16 to provide openings 70. The width of flange 50 is essentially the same width as the flanges 21. The function of flange 50 is to abut the lower surface of top 10 to thereby provide a seal for the upper end of cover 20, when the cover 20 is installed on the housing 9.

At the lower end of the cover 20, in the central portion of the common edge 51 between flange 22 and face plate 23, is a rectangular opening or slot 52, the function of which is to receive the upper leaf spring jaw 53 of a latch carried by housing 9. A lower leaf spring jaw 54 cooperates with jaw 53 for retaining the cover 20 in its seated position on the front edges of sides 13 and bottom 12.

In more detail, the jaws 53 and 54 are each formed from flat rectangular strips of spring steel, the outer edges of which are arcuate. The rearmost edge portions of jaws 53 and 54 register with each other and are secured by rivets 55 to the inner surface of bottom 12. The upper jaw 53 protrudes forwardly therefrom through a rectangular slot 56 in flange 17 while the jaw 54 is bent downward, then forwardly so as to pass through a slot 57 in bottom 12. Thence, the jaw 54 protrudes forwardly essentially parallel to jaw 53 and is bent upwardly to provide an upstanding lip 58 for retaining the lower edge portion of cover 20. Thereafter, the jaw 54 is curved downwardly to diverge from jaw 53. A reinforcing spring 59 urges the jaw 54 into engagement with jaw 53.

When the housing 9 is properly wired and mounted against an upright support and the meter 25 installed in the terminals, the cover 20 may be installed over the housing 9 by placing it over the meter 25 and moving it inwardly in a tilted condition so that the openings 70 are received on flanges 16. Thereafter, the cover is urged inwardly and to an upright position whereby its upper edge portion is received under flange 14' as the central portion of flange 22 is received between jaws 53, 54'. The curved surface of jaw 54 acts as a cam to urge the cover 20 upwardly, whereby the flange 50 abuts the inner surface of top 10 as the flange 22 passes beyond lip 58 and the jaw 54 snaps to its cover retaining position shown in FIG. 2. By this action, the peripheral portion of cover 20 surrounding the meter 25 snugly abuts the front surface of sealing ring 28 to thereby lock the meter 25 in place with respect to the meter box.

When the cover 20 is installed, as described above, the liquid deflecting plate 40 is superimposed between the live elements, i.e. the lower cables (not shown) and the lower portions of the terminals 26, and moisture entering through the various joints between the cover 20, meter 25 and housing 9. What little moisture or water which may leak through cover 20 from, say a "driving rain," collects mainly on the sealing ring 28 and by gravity and capillary attraction tends to run downwardly and around the ring 28 so as to drip from the bottom of ring 28 onto the deflector plate 44. The deflector plate 44, in turn, directs the water toward face plate 23 whence it runs outwardly toward the edges 49 of the gutter 40 and adheres to the inner surface of the face plate 23 as it continues its downward path. Upon reaching the bottom 12, the water may pass outwardly of housing 9 through holes (not shown) which are normally found in the bottom of the meter box or through the slits and openings such as slot 57 or the aligned slots 56, 52.

By catching the water in the gutter 40, it is prevented from splattering or splashing onto the lower terminals 26 and their associated cables (not shown). Likewise, since the channel members 18 are forwardly of the shield 45, any moisture collecting thereon will pass to the face plate 23 and thence to the bottom or drip directly on the gutter 40.

While essentially no water passes the flange or shield 50, if it does, the water leading from the innermost edge of flange 50 will collect on the ring 28 and hence lead eventually to the gutter or will adhere to face plate 23 or will fall directly onto the gutter 40. In any event, the terminals 26 and their cables remain essentially dry.

It will be obvious to those skilled in the art that many variations may be made in the embodiments chosen for the purpose of illustrating the present invention without departing from the scope thereof as defined by the appended claims.

I claim:

1. In a meter box of the class having a housing and a removable cover for said housing and wherein a meter is received in terminals carried within said housing, the meter having a sealing ring around it against which a peripheral portion of said cover abuts when said cover is close to said housing, the combination therewith of a gutter secured to the inner surface of said cover and spaced from and below said ring of said meter for receiving moisture which may drip from said ring and for deflecting said moisture away from said terminals.

2. In a meter box of the class having a housing and a removable cover for said housing and wherein a meter is received in terminals carried within said housing, the meter having a sealing ring around it against which a peripheral portion of said cover abuts when said cover is close to said housing, the combination therewith of a gutter secured to the inner surface of said cover below said ring of said meter for receiving moisture which may drip from said ring and for deflecting said moisture away from said terminals, said gutter including a base secured to said cover, a deflector plate carried by said base and inclined forwardly toward said cover and a shield carried by said deflector for shielding a portion of said terminals.

3. In a meter box of the class having a housing and a removable cover for said housing and wherein a meter is received in terminals carried within said housing, the meter having a sealing ring around it against which a peripheral portion of said cover abuts when said cover is close to said housing, the combination therewith of a gutter secured to the inner surface of said cover below said ring of said meter for receiving moisture which may drip from said ring and for deflecting said moisture away from said terminals, said gutter including a base secured to said cover, a deflector plate carried by said base and inclined forwardly toward said cover, a shield carried by said deflector for shielding a portion of said terminals, said shield being secured to the innermost edge of said deflector plate and being disposed in essentially parallel relationship to said cover, the upper edge of said shield being upwardly concaved and essentially concentric and spaced below and inwardly of said ring, said shield being in spaced relationship to said terminals.

4. A meter box for mounting a meter of the type having a sealing ring and spades which are received in terminals within the meter box comprising, a forwardly open housing, said terminals being carried by said housing, a removable rectangular cover for closing the opening of said housing, a top flange extending from the top edge of said cover for abutting the inner surface of said top when said cover is installed on said housing, said cover having a central opening therein through which said meter projects, the peripheral portion of said cover which surrounds said opening abutting said sealing ring when said cover is installed on said housing, and a sheet metal gutter mounted on the inner surface of said cover below said opening such that moisture dripping from said ring is received on said gutter and directed toward the inner surface of said cover.

5. A meter box for mounting a meter of the type having a sealing ring and spades which are received in terminals within the meter box comprising a forwardly opening housing, said terminals being carried by said housing, a removable rectangular cover carried for closing the opening of said housing, said cover having a central circular opening therein through which said meter projects, the peripheral portion of said cover which surrounds said opening abutting said sealing ring when said cover is installed on said housing, and a sheet metal gutter mounted on the inner surface of said cover below said opening, said gutter having a rectangular base disposed horizontally and secured to said inner surface of said cover, a deflector plate carried by the upper edge of said base and protruding rearwardly and upwardly therefrom, and a shield extending from the rearmost edge of said deflector plate, said shield being essentially parallel to said cover, the upper edge of said shield being concaved upwardly and essentially concentric with said opening, said upper edge of said shield being of greater diameter than said opening, said gutter being spaced inwardly from the sides of said cover and extending over substantially the entire width of said cover, said shield being spaced below and rearwardly of the inner side of said sealing ring such that moisture dripping from said ring is received on said deflector plate and directed toward the inner surface of said cover.

6. A meter box for mounting a meter of the type having a sealing ring and spades which are received in terminals within the meter box comprising a housing having a back, parallel sides, a bottom and a top parallel to said bottom, said terminals being carried by said back, the front edges of said sides and bottom terminating in a common plane parallel to said back, a flange on the forward edge of said top for overhanging said sides, a removable rectangular cover carried in essentially said common plane by said housing, side and bottom flanges extending from the sides and bottom edges of said cover for overlapping the forward edge portions of said sides and said bottom of said housing, and a top flange extending from the top edge of said cover and spaced inwardly from said side flanges of said cover for abutting the inner surface of said top when said cover is installed on said housing, said cover having a circular opening therein through which said meter projects, the peripheral portion of said cover which surrounds said opening abutting said sealing ring when said cover is installed on said housing.

7. A meter box for mounting a meter of the type having a sealing ring and spades which are received in terminals within the meter box comprising a housing having a back, parallel sides, a bottom and a top parallel to said bottom, said terminals being carried by said back, the front edges of said sides and bottom terminating in a common plane parallel to said back, a flange on the forward edge of said top for overhanging said front edges of said sides, a removable rectangular cover carried in essentially said common plane by said housing, side and bottom flanges extending from the sides and bottom edges of said cover for overlapping the forward edge portions of said sides and said bottom of said housing, a top flange extending from the top edge of said cover and spaced inwardly from said side flanges of said cover for abutting the inner surface of said top when said cover is installed on said housing, said cover having a circular opening therein through which said meter projects, the peripheral portion of said cover which surrounds said opening abutting said sealing ring when said cover is installed on said housing, and a sheet metal gutter mounted on the inner surface of said cover below said opening, said gutter having a rectangular base disposed horizontally and secured to said inner surface of said cover, and a deflector plate carried by the upper edge of said base and protruding rearwardly therefrom such that moisture dripping from said ring is received on said deflector plate and directed away from said terminals.

8. A meter box for mounting a meter of the type having a sealing ring and spades which are received in terminals within the meter box comprising a housing having a back, parallel sides, a bottom and a top parallel to said bottom, said terminals being carried by said back, the front edges of said sides and bottom terminating in a common plane parallel to said back, a flange on the forward edge of said top for overhanging said front edges of said sides, a removable rectangular cover carried in essentially said common plane by said housing, side and bottom flanges extending from the sides and bottom edges of said cover for overlapping the forward edge portions of said sides and said bottom of said housing, a top flange extending from the top edge of said cover and spaced inwardly from said side flanges of said cover for abutting the inner surface of said top when said cover is installed on said housing, said cover having a circular opening therein through which said meter projects, the peripheral portion of said cover which surrounds said opening abutting said sealing ring when said cover is installed on said housing, and a sheet metal gutter mounted on the inner surface of said cover below said opening, said gutter having a rectangular base disposed horizontally and secured to said inner surface of said cover, a deflector plate carried by the upper edge of said base and protruding rearwardly and upwardly therefrom, and a shield extending from the rearmost edge of said deflector plate such that moisture dripping from said ring is received on said deflector plate and directed toward the inner surface of said cover.

9. A meter box for mounting a meter of the type having a sealing ring and spades which are received in terminals within the meter box comprising, a housing having a back, parallel sides, a bottom and a top parallel to said bottom, said terminals being carried by said back, the front edges of said sides and bottom terminating in a common plane parallel to said back, a flange on the forward edge of said top for overhanging said front edges of said sides, a removable rectangular cover carried in essentially said common plane by said housing, side and bottom flanges extending from the sides and bottom edges of said cover for overlapping the forward edge portions of said sides and said bottom of said housing, a top flange extending from the top edge of said cover and spaced inwardly from said side flanges of said cover for abutting the inner surface of said top when said cover is installed on said housing, said cover having a circular opening therein through which said meter projects, the peripheral portion of said cover which surrounds said opening abutting said sealing ring when said cover is installed on said housing, and a sheet metal gutter mounted on the inner surface of said cover below said opening, said gutter having a rectangular base disposed horizontally and secured to said inner surface of said cover, a deflector plate carried by the upper edge of said base and protruding rearwardly and upwardly therefrom, a shield extending from the rearmost edge of said deflector plate, said shield being essentially parallel to said cover, the upper edge of said shield being concaved upwardly and essentially concentric with said opening, said upper edge of said shield being of greater diameter than said opening, said gutter being spaced inwardly from said side flanges of said cover and extending over substantially the entire width of said cover, said shield being spaced below and rearwardly of the inner side of said sealing ring such that moisture dripping from said ring is received on said deflector plate and directed toward the inner surface of said cover.

References Cited in the file of this patent

UNITED STATES PATENTS

| | | |
|---|---|---|
| 2,972,658 | Fisher | Feb. 21, 1961 |
| 3,014,162 | Carlisle | Dec. 19, 1961 |